No. 721,568. PATENTED FEB. 24, 1903.
J. KELLEY, & W. V. & P. A. REID.
WIRE STAY MAKING MACHINE.
APPLICATION FILED NOV. 21, 1901.
NO MODEL. 8 SHEETS—SHEET 3.
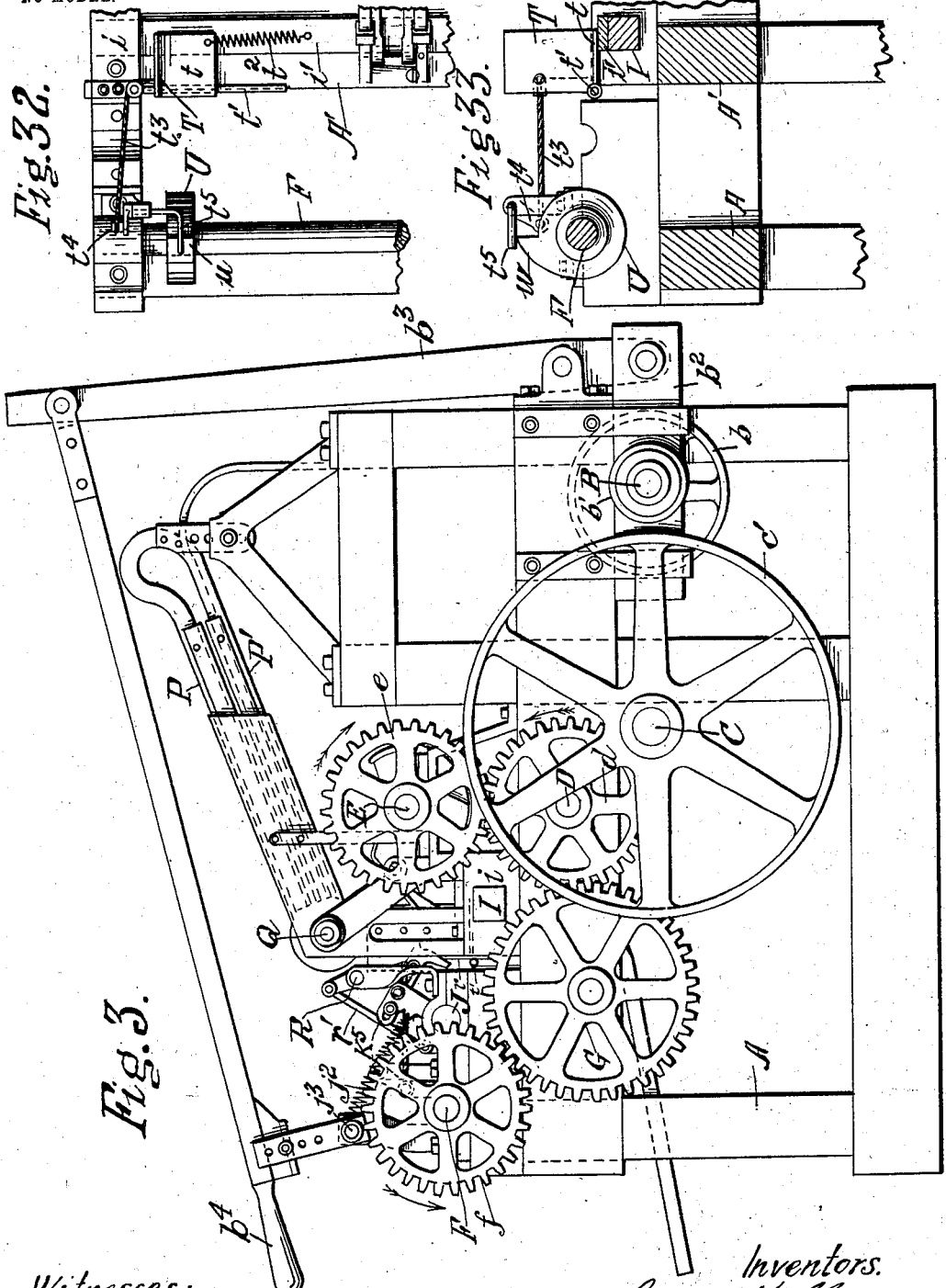
Witnesses:
C. N. Woodward
Inventors.
James Kelley
Walter V. Reid
Pettis A. Reid
By Julian  his atty No. 721,568. PATENTED FEB. 24, 1903.
J. KELLEY, & W. V. & P. A. REID.
WIRE STAY MAKING MACHINE.
APPLICATION FILED NOV. 21, 1901.
NO MODEL. 8 SHEETS—SHEET 4.
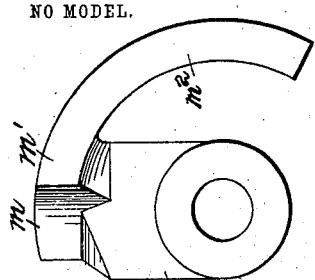
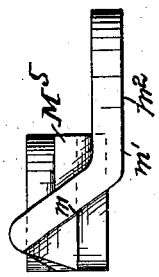
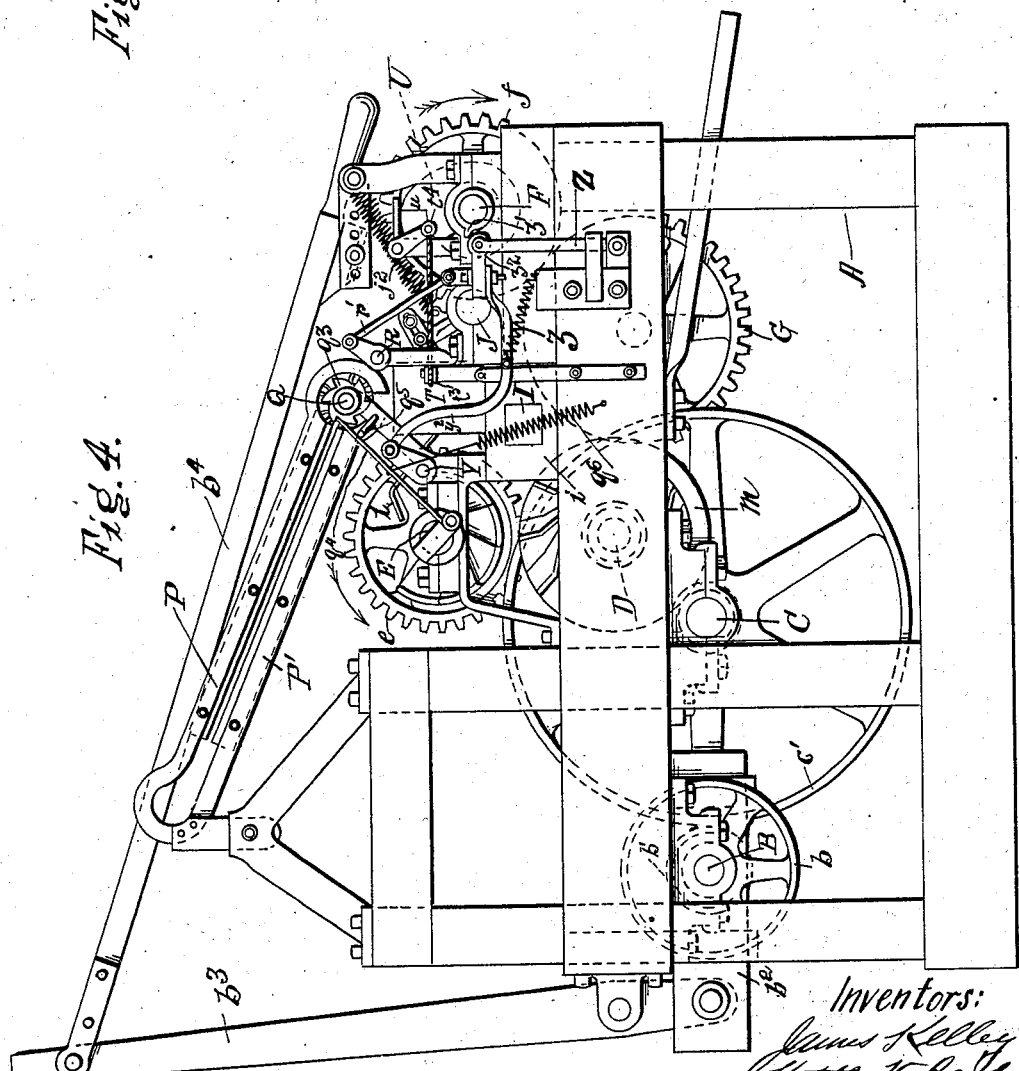
Witnesses:
Inventors:

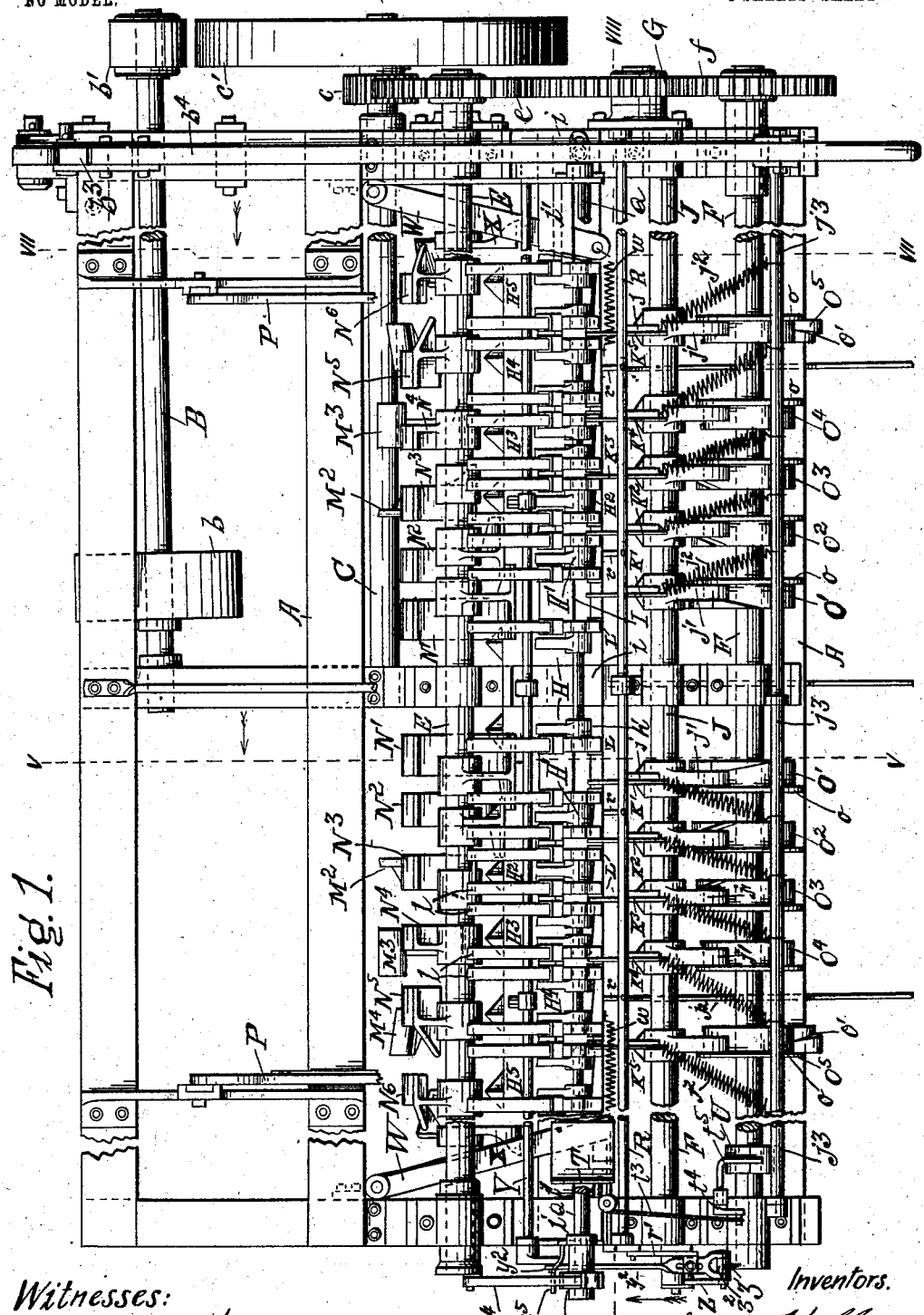

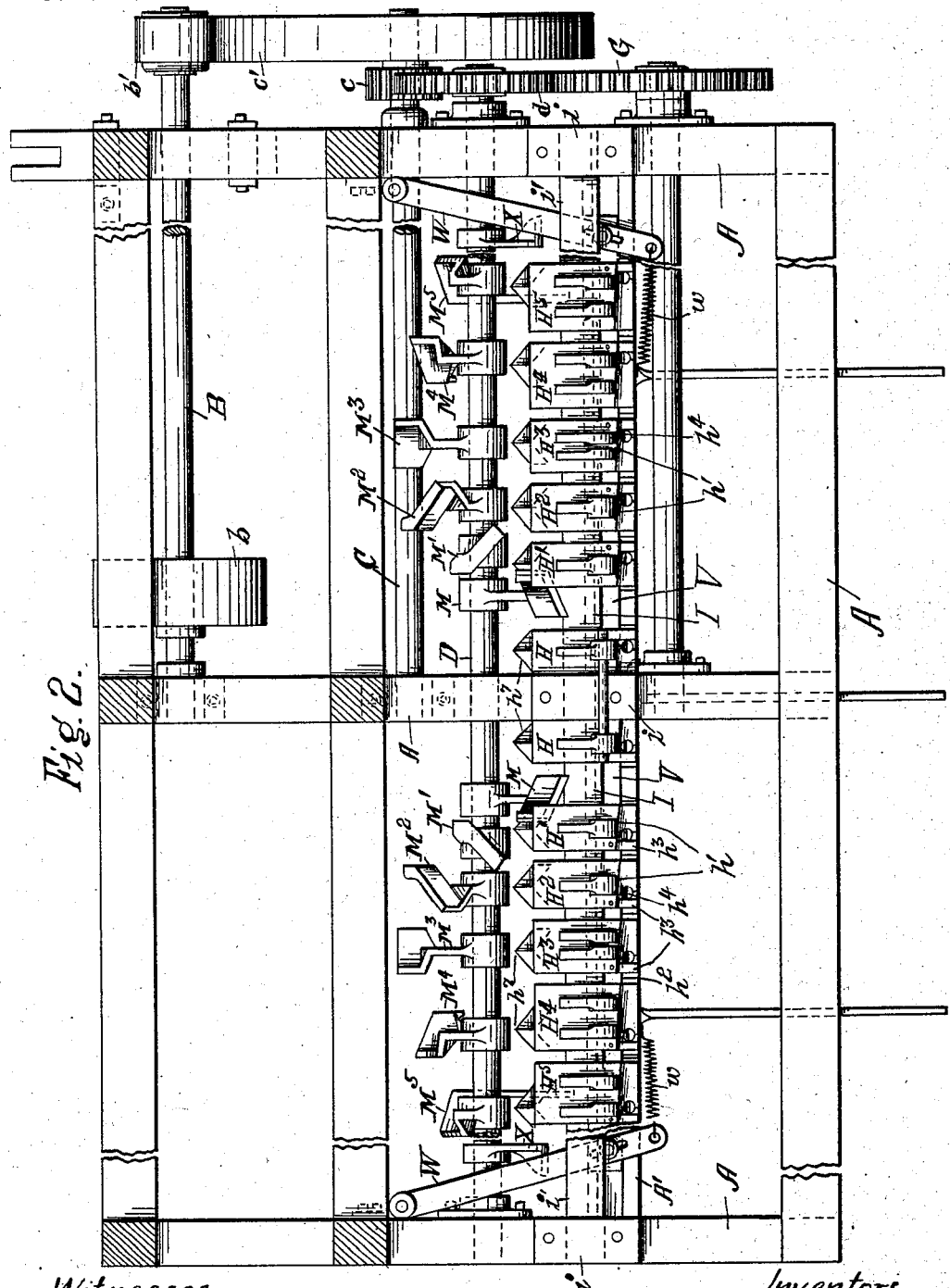

No. 721,568. PATENTED FEB. 24, 1903.
J. KELLEY, & W. V. & P. A. REID.
WIRE STAY MAKING MACHINE.
APPLICATION FILED NOV. 21, 1901.
NO MODEL. 8 SHEETS—SHEET 5.
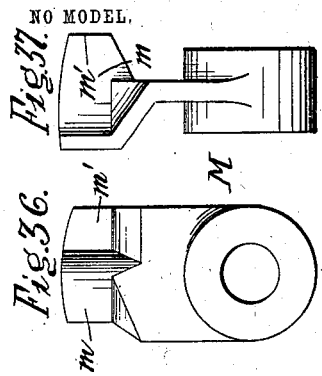
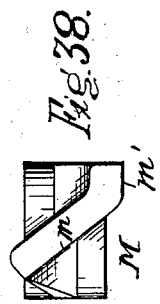
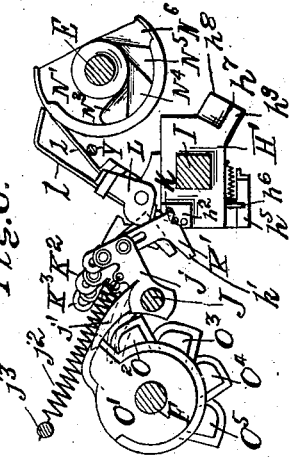
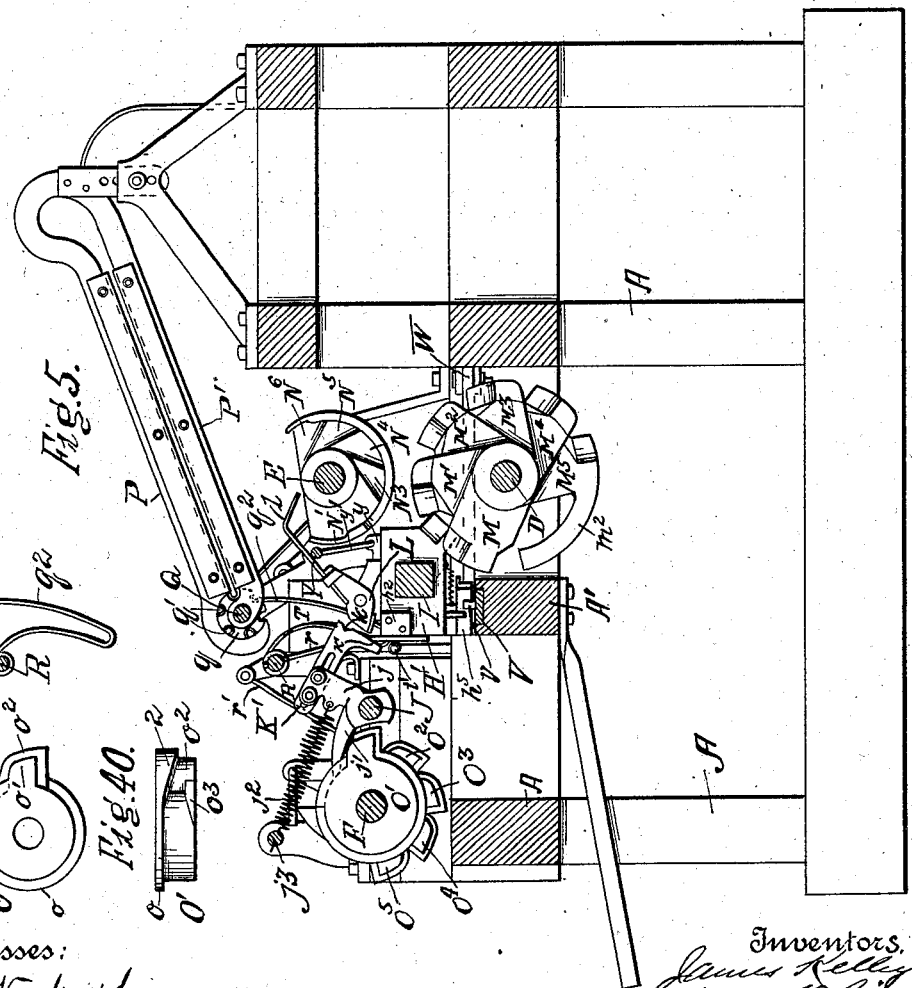

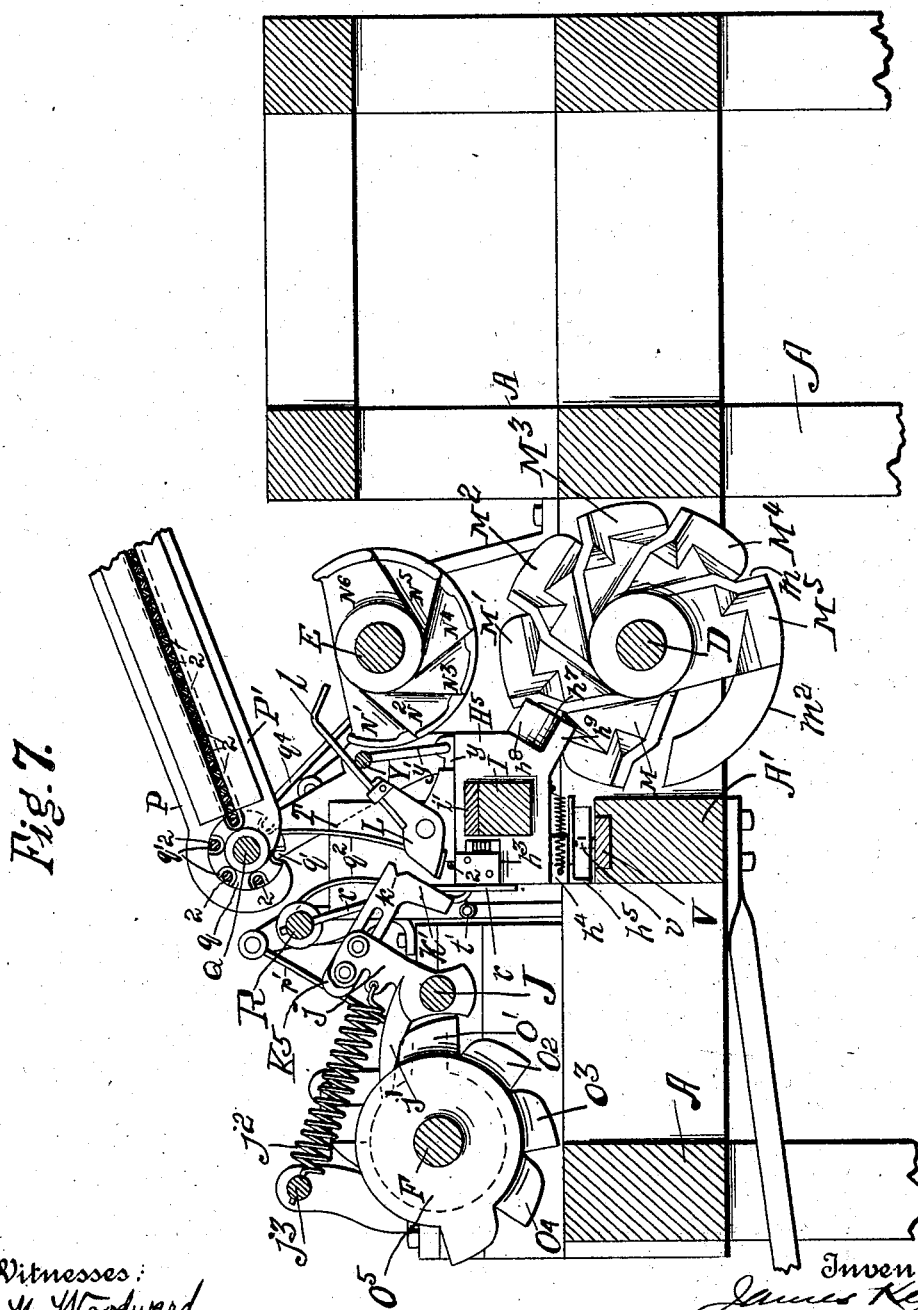

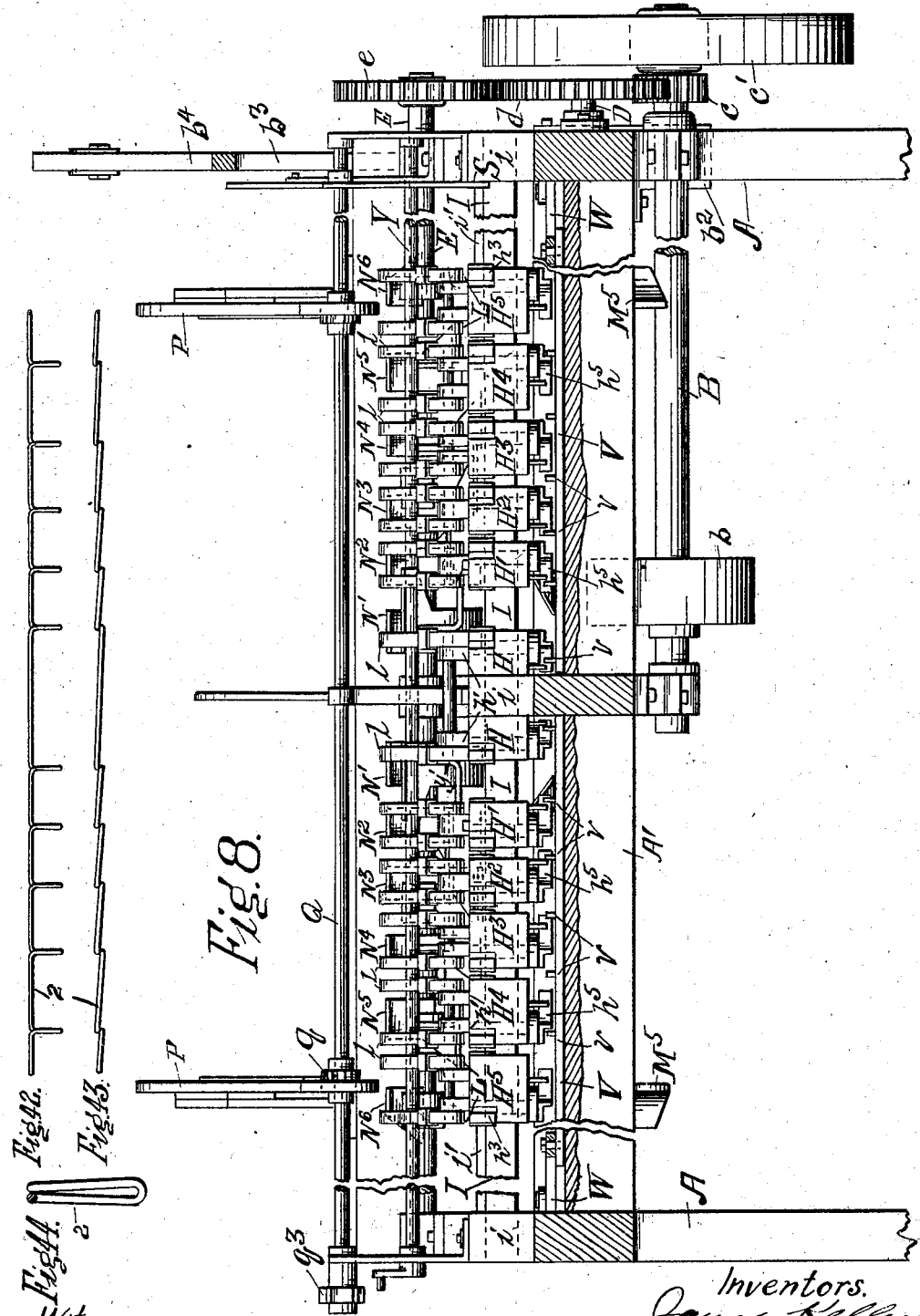

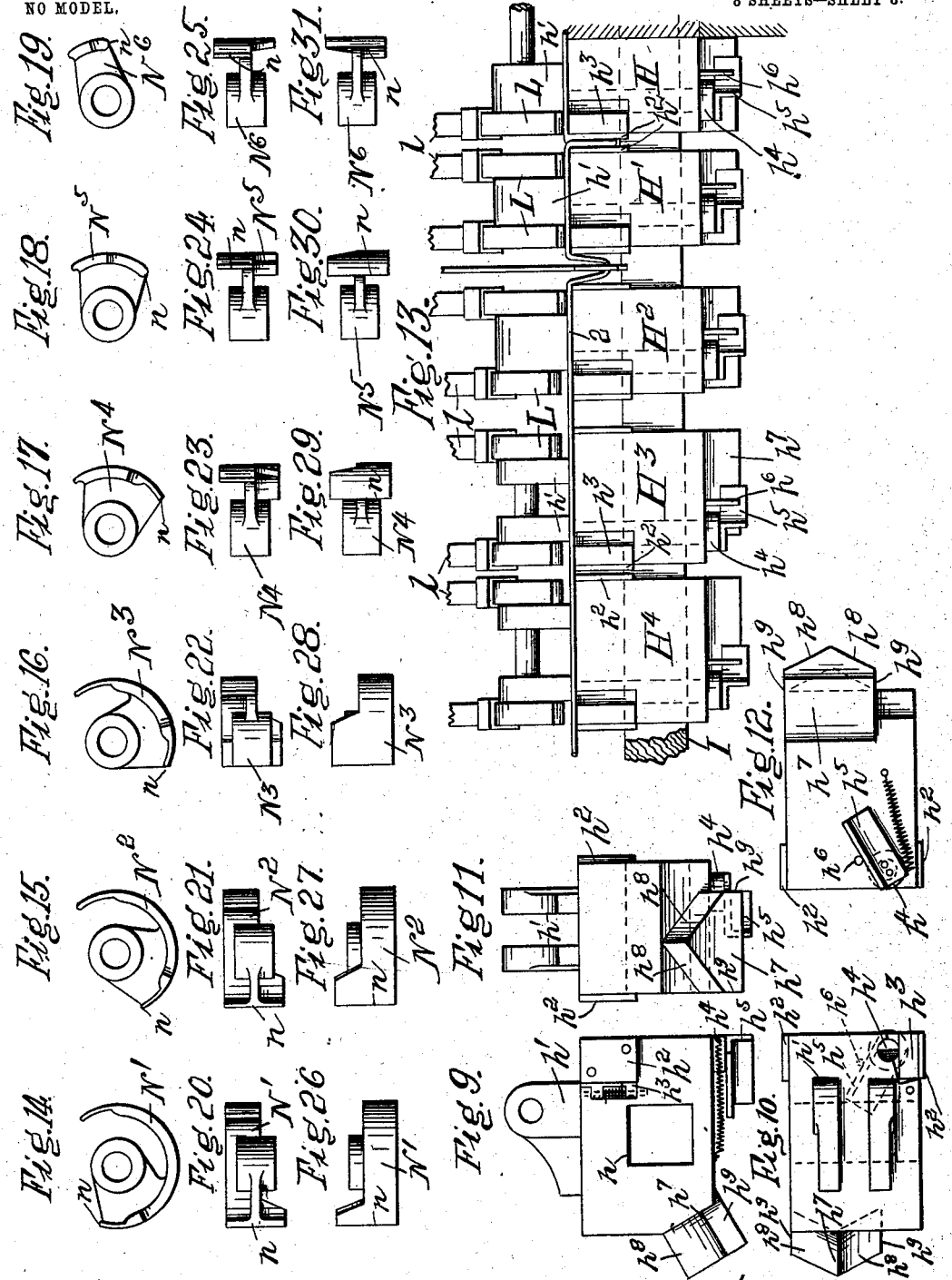

UNITED STATES PATENT OFFICE.

JAMES KELLEY, WALTER V. REID, AND PETTIS A. REID, OF RICHMOND, INDIANA; SAID JAMES KELLEY AND WALTER V. REID ASSIGNORS TO PETTIS A. REID.

WIRE-STAY-MAKING MACHINE.

SPECIFICATION forming part of Letters Patent No. 721,568, dated February 24, 1903.

Application filed November 21, 1901. Serial No. 83,171. (No model.)

*To all whom it may concern:*

Be it known that we, JAMES KELLEY, WALTER V. REID, and PETTIS A. REID, citizens of the United States, residing at Richmond, in the county of Wayne and State of Indiana, have invented certain new and useful Improvements in Wire-Stay-Making Machines; and we do hereby declare the following to be a full, clear, and exact description of the invention, such as will enable others skilled in the art to which it appertains to make and use the same.

This invention relates to machines for making wire stays or cross-wires designed for attachment to a series of strand-wires in the manufacture of wire fencing or fabrics.

The principal object of the invention is to provide a highly-efficient machine for rapidly producing uniform stays consisting of wires having at intervals therein bent portions or loops adapted to be coiled or wrapped about the strand-wires for attaching the stays thereto.

In carrying our invention into effect the wires which are to be formed into stays being first cut into proper lengths may be successively delivered lengthwise upon a series of loop-pressing clamps or jaws arranged to separate and close consecutively or, preferably, to move alternately first in groups or divisions in opposite directions from an intermediate point or an intermediate fixed member of the series and then in opposite pairs consecutively back toward each other or against said fixed member. Each wire is preferably gripped or otherwise secured against adjacent clamps or opposite pairs of adjacent clamps in succession as said clamps consecutively stand separated, and the intermediate portions thereof, which span the spaces between said adjacent clamps, are successively bent or folded in between the latter as the outer separated clamps move consecutively inward against the others, thus producing the loops, on completion of which operation the loops may be released simultaneously from between all of the closed clamps and the finished stay withdrawn or ejected from the machine. The several clamps and coöperating mechanism being thus arranged to operate in succession, all heavy jarring, as well as undue strain of the parts, is consequently avoided.

The invention will first be hereinafter more particularly described with reference to the accompanying drawings, which form a part of this specification, and then pointed out in the claims following this description.

In said drawings, in which corresponding parts in the several views are designated by similar letters of reference, Figure 1, Sheet 1, is a plan view of a wire-stay-making machine embodying my invention, intermediate portions near each end thereof being broken away to reduce the width and the parts being represented in the relative positions assumed immediately after outward movement of the movable loop-pressing clamps or immediately after delivery of a wire and before operation to form the same into a stay. Fig. 2, Sheet 2, is a similar plan view, partly in section and with various operative parts removed for the purpose of illustrating more clearly the construction and arrangement of the clamps and their operating cams or devices. Fig. 3, Sheet 3, is an end view of the machine. Fig. 4, Sheet 4, is a similar view looking toward the opposite end to that shown in the preceding figure. Fig. 5, Sheet 5, represents a vertical cross-section taken on the line V V of Fig. 1 looking in the direction of the arrow. Fig. 6, same sheet, is a fragmentary detail view, in vertical cross-section, illustrating the operation of bending a portion of a wire in between adjacent clamps as the latter close together. Fig. 7, Sheet 6, represents an enlarged vertical cross-section taken on the line VII VII of Fig. 1 looking in the direction of the arrow. Fig. 8, Sheet 7, represents a longitudinal vertical cross-section taken on line VIII VIII of Fig. 1. Fig. 9, Sheet 8, is a detail view, in side elevation, of one of the clamps. Figs. 10, 11, and 12, same sheet, represent, respectively, top, rear, and bottom elevations of said clamps. Fig. 13, same sheet, is a detail view of a number of clamps of the series, illustrating the operation of forming successively loops in a wire.

Figs. 14 to 19, inclusive, same sheet, are detail views, in side elevation, of the several members of a group of wipers or wire-gripper-operating devices, the group shown being that at the right-hand side of the machine herein illustrated. Figs. 20 to 25, inclusive, are plan views of said wipers, and Figs. 26 to 31, inclusive, bottom views thereof. Figs. 32 and 33, Sheet 3, are detail views, in plan and end elevation, respectively, of a butter or device for pushing the wire endwise into proper position upon the clamps, together with means for actuating said butter. Figs. 34 and 35, Sheet 4, are detail views, in side elevation and plan, respectively, of a cam or device for operating one of the end clamps of the series. Figs. 36, 37, and 38, Sheet 5, are detail views, in side elevation, front elevation, and plan, respectively, of one of the clamp-operating cams. Figs. 39 and 40, same sheet, are detail views, in side elevation and plan, respectively, of one of the needle-actuating cam-wheels. Fig. 41, same sheet, is a detail view of one of the guides for directing the wires as they are delivered into proper position upon the clamps. Figs. 42 and 43, Sheet 7, are front and plan elevations, respectively, of one of the finished stays produced by the machine herein illustrated; and Fig. 44 represents an enlarged end elevation of said stay.

Referring to the drawings by specific letters of reference, A designates the several members of a suitable supporting-frame for the machine.

The letter B denotes a power-shaft to which power from the engine or motor may be applied at a friction-pulley $b$, and C denotes an idle shaft driven by the power-shaft through the medium of friction gears or drum $b'$ and $c'$ and driving in turn, through the medium of suitable gearing, three uniformly-rotating shafts D, E, and F, the said idle shaft being herein represented provided with a pinion $c$, in gear with a spur-wheel $d$ on the shaft D, which spur meshes with an equal spur $e$ on the shaft E and is also in gear, through the medium of an interposed idle wheel G, with an equal spur $f$ on the shaft F, the arrangement thus being such that the shaft E, which is preferably disposed above the shaft D, rotates in an opposite direction to the latter, while the shaft F, preferably disposed in advance of the others, rotates in the same direction with said shaft D, as indicated by the arrows in Fig. 3, though it will be understood that the arrangement may be varied in machines of modified construction, if desired.

The friction-gear $b'$ is preferably adapted to be moved into or out of driving contact with the friction-gear $c'$ for the purpose of instantly applying or shutting off the power at will, that end of the shaft B to which the friction-gear is secured being mounted in a movable journal $b^2$, herein represented connected to a lever $b^3$ under control of the operator by a handle $b^4$, which is self-locking in position to apply the power, as will be readily understood by reference to Figs. 3 and 4, in the former of which figures the friction-gear $b'$ is shown out of contact with the drum $c'$, while in the latter it is represented thrown into driving engagement therewith. While the interposed idle shaft C is preferably employed for the purposes of taking initial strain from the power-shaft and properly reducing the speed, it will be understood, nevertheless, that the power may in some instances be applied directly to the main shaft D.

Before proceeding further it may be stated that in the machine herein illustrated the wires in being formed into stays are worked from their centers toward their opposite ends simultaneously, and the loop-forming mechanism and the actuating devices therefor are accordingly represented symmetrically arranged in two oppositely-operating groups or divisions, in which the corresponding parts or members are of similar though reverse construction. The machines may, however, be differently constructed and designed to work the wires from end to end or from ends to center or otherwise, and it will be understood, therefore, that the invention is by no means limited to the construction and arrangement illustrated.

Longitudinally disposed between the shaft F and shafts D and E is a series of loop-pressing clamps, the corresponding members of which at opposite sides of the machine or of each division, as above noted, are for convenience of reference designated, respectively, by the letters H, H', $H^2$, $H^3$, $H^4$, and $H^5$. The said clamps may be slidably supported on a square or polygonal slide or guide-beam I, extending through similarly-shaped openings in the clamps and secured in suitable blocks or supports $i$ at the ends and middle of the machine, the innermost clamps H of the series being preferably secured in fixed position, as by uniting them at opposite sides of the middle block $i$, while the remaining ones at each side thereof are left movable on the slide I. Immediately preceding each stay-making operation, all the clamps being closed together, the said movable ones are shoved or moved simultaneously in opposite groups outwardly or toward opposite ends of the machine, thus separating the innermost movable clamps H' a suitable distance from the fixed clamps, as shown in Figs. 1, 2, and 8. The wire to be formed into a stay is then preferably gripped or otherwise secured firmly against the fixed clamps and adjacent but separated ones H', which latter are thereupon returned or shoved inwardly toward the former, while simultaneously with such movement the portions of wire extending across the intervening spaces are bent or folded in between said clamps, thus producing loops which are pressed into proper form by the clamps as the outer members close against the inner ones. The wire is then rigidly secured against the next and now-separated clamps H², which thereupon move inwardly against the clamps H', while portions of the wire are simultaneously bent into loops between said clamps in the same manner as before, and so on to the ends of the series, the clamps of each group consecutively separating from their adjacent outer ones and returning to the adjacent inner ones, while the portions of wire extending across the consecutively-created spaces are successively bent or folded into loops between the clamps as they close one against another. When the last or outermost clamps of the series finally close against the preceding members, the loops are released from between the closed clamps and the finished stay withdrawn or ejected from the machine.

It will be observed that the adjacent fixed clamps H constitute, in effect, a single wide clamp, which determines the distance between the two innermost loops of the stay to be produced, the present machine being designed for making double stays or cross-wires, as shown in Figs. 42 and 43, which may be severed afterward into shorter stays of equal length and like formation, wherefore it is desirable that the innermost adjacent loops of said double stays be formed at greater intervals than the other loops for the purpose of leaving sufficient lengths of straight wire at the ends of the severed stays. In a single machine a narrow fixed clamp, corresponding in width to the remaining members of the series, would preferably be employed. It will also be observed that in the present machine the clamps of each group are formed successively wider, which is for the purpose of producing stays having their loops disposed at successively-wider intervals, the same being thus adapted for attachment to a series of strand-wires arranged at successively-increasing gages. In a single machine the clamps would preferably be formed successively wider from end to end of the series, though it will be understood that the arrangement may be varied according to the character of the stays to be produced.

A shaft J, longitudinally disposed in advance of the clamps, supports a series of movable needles or wire-bending devices, corresponding in number and arrangement to the spaces between the clamps and correspondingly designated at opposite sides of the machine by the reference-letters K' K² K³ K⁴ K⁵, &c., respectively. The needles of each group are adapted to engage in succession the portions of wire which span the consecutively-created spaces between the clamps of the corresponding group and each needle operating in connection with and moving longitudinally between a pair of adjacent clamps to bend or fold the wire between said clamps as they consecutively close one against the other, all as hereinafter explained. The clamps, one of which is shown in detail in Figs. 9 to 12, inclusive, may consist of suitable blocks or heads having square or polygonal openings $h$ therethrough, which slidably embrace the slide or guide-beam I. The said clamps are preferably provided at their upper surfaces with upstanding abutments or projections $h'$, against which abutments of one clamp after another of each group of clamps the wire being formed into a stay is in turn forced and secured as the clamps of said group consecutively separate and close together. At the outer sides of said abutments of each clamp a pair of grippers or wire-grabbing devices L may be pivoted, the adjacent ones of which grippers of each adjacent pair of clamps while the latter stand separated are caused to grip the wire as soon as it is forced against the adjacent abutments of said separated clamps and to firmly hold the same down upon the clamps as the outer one thereof closes against the other, the grippers of the several clamps continuing their hold upon the wire until the outermost loops of the stay are produced, and thereupon releasing the wire simultaneously, all by means hereinafter explained. The said abutments $h'$ of the clamps are preferably formed with correspondingly-oblique faces throughout the entire series, as shown in Figs. 1 and 2, so that each wire as it is successively pushed and secured against adjacent abutments of the consecutively-separated clamps of each group is successively deflected across the consecutively-created spaces and of course oppositely deflected across the clamps, whereby the portions of the wire which extend across said spaces are folded and pressed into loops having both members of each lying in the same transverse plane to the body of the stay, while the intermediate straight portions of the wire are left diverging from and to corresponding members of adjacent loops, thus producing stays of the character represented in Figs. 8 and 9, which are adapted to be placed against a series of strand-wires in the subsequent manufacture of the fabric, with the two members of each loop contacting with one of said strand-wires, whereby said stays may be attached to the latter without first bending the loops to one side or the other or turning the stay as a whole before the twisting operation. It will be understood, however, that the said abutments may be differently arranged and stays of different character or formation accordingly produced and also that the above-stated purpose may be attained by other means, as by inserting short pins or projections in front of the abutments at corresponding sides of the clamps. The clamps may be provided with confronting flat anvil-plates or projections, as $h^2$, between which the loops of the stay are pressed as the clamps close one upon another, and the anvil-plates at preferably-corresponding sides of the clamps of each group are secured to or formed on movable face portions or hinged face-plates, as $h^3$, which movable face-plates of the entire series are adapted when all the clamps are brought together to turn into or recede within suitable cut-away portions or recesses in the same sides of the clamps for the purpose of releasing the loops to permit the finished stay to be withdrawn, the said hinged face-plates being preferably spring-pressed against suitable devices, such as the particylindrical portions of mutilated spindles $h^4$, journaled in the clamps beside the plates and normally maintained in position to hold them outward, but adapted to be turned to permit them to recede within said recesses, which spindles in the present construction are provided at their lower protruding ends with short levers or toes $h^5$, which are normally spring-maintained against suitable pins or stops, as $h^6$, but are adapted to be simultaneously engaged and moved by suitable devices to turn the spindles and permit the plates $h^3$ to recede and release the loops. The clamps may be further provided with rearward cam projections $h^7$, extending, preferably, toward the axis of the shaft D and formed, preferably, with opposite bearing-surfaces, which are initially inclined, as at $h^8$, and terminally vertical, as at $h^9$, Figs. 9, 11, and 12, said cam projections being designed for engagement by the clamp-operating cams or devices now to be described. The movable clamps of each group are engaged by their operating-cams only at the outer sides of their cam projections, except the innermost one, H', which is also first engaged at the inner or opposite side of its said projection to shove the group outward; but the several clamps are nevertheless similarly constructed, both for convenience of manufacture and to render them adaptable for use at any positions in the series. The movable clamps of each group may be operated by a series of cams M M' $M^2$ $M^3$ $M^4$ $M^5$, &c., spirally arranged on the shaft D and adapted to engage said clamps in consecutive order, at each revolution of the shaft the innermost cam M first engaging and moving the innermost movable clamp H' away from the fixed clamp or clamps H, thereby shoving the whole group outward, and the remaining cams then engaging and returning the clamps in succession, shoving them inwardly one after another, in the manner before explained. Outward movement of both groups of clamps under action of the cams M may be properly limited by suitable stops or abutments, herein shown as bars $i'$, secured upon the slide I between the outermost clamps of the series and the blocks $i$ at the ends of the machine. For proper engagement with the rearward cam projections $h^7$ of the movable clamps the cams, one of which is shown in detail in Figs. 36 to 38, inclusive, may be formed with their cam-surfaces substantially perpendicular to the shaft D and initially inclined, as at $m$, but terminally vertical, as at $m'$, for wiping contact, respectively, with the inclined surfaces $h^8$ and terminal vertical surfaces $h^9$ of said cam projections. The cams of each group are substantially identical, except the first one, M, which is constructed with its cam-surfaces oppositely disposed to or confronting the cam-surfaces of the others, being designed to shove the clamps in an opposite direction to the others, as above noted. In operation the clamps of each group being all closed together, the cam M first shoves the group outward by wiping engagement of its oblique surface $m$ against the inclined surface $h^8$ at one side of the cam projection of the first clamp H' and holds the group an instant in their extreme outward position by sliding contact of its terminal surface $m'$ against the terminal vertical surface $h^9$ of said cam projection. As soon as said cam passes from said clamp the next cam M' is brought into engagement therewith, shoving the same immediately back or inwardly against the fixed clamp by contact of its oblique surface $m$ against the inclined surface $h^8$ at the opposite side of said cam projection, holding said movable clamp firmly against the fixed clamp by contact of its terminal surface $m'$ against the terminal vertical surface $h^9$ of said projection, while the next cam $M^2$ engages and shoves the succeeding clamp $H^2$ in the same manner inwardly against the clamp H', which clamp $H^2$ is similarly held against the preceding clamp H', while the next cam $M^3$ engages and shoves inwardly the succeeding clamp $H^3$, and so on to the end of the group. The last or outermost cam $M^5$ of each group, as shown in Figs. 5, 6, 34, and 35, is preferably provided with a wing $m^2$ or extension of its terminal surface, which after said cam has shoved the outermost clamp inwardly bears against the outer vertical surface $h^9$ of the cam projection of said clamp, and thereby holds the group in their inward position pending release of the loops and withdrawal of the stay, said extension leaving said outermost clamp just before the first cam M comes again into engagement with the first movable clamp to move the group outward. It will be understood, of course, that the cams may in some instances be differently constructed or the clamps operated by other suitable means.

The grippers L, which are caused to grip the wire successively in pairs at adjacent sides of the clamps as the latter consecutively stand apart, are preferably provided with rearwardly-bent projections or fingers $l$, which may rest normally upon a longitudinal support, as the stay-ejector-operating rock-shaft Y, hereinafter referred to, but are adapted to be raised to force the grippers down upon the wire in an obvious manner. The grippers of the clamps of each group may be operated by a series of wipers on the shaft E, (designated, respectively, by the letters N' $N^2$ $N^3$ $N^4$ $N^5$, &c.,) the same being arranged to engage and lift in succession the fingers of the successive pairs of grippers at the proper periods, each wiper maintaining the particular pair of gripper-fingers engaged thereby raised, while the outer clamp of the particular separated couple closes against the inner one as well, as until the outermost clamp or clamps of the series are moved inwardly, whereupon all the wipers pass at substantially the same instant from under and drop the fingers of all the grippers to cause the latter simultaneously to release the wire. The wipers of each group, as shown more clearly in Fig. 1 and detail Figs. 14 to 31, inclusive, may consist of successively shorter mutilated rollers or segments of cylinders arranged with their foremost or initially-acting edges $n$ successively one behind another for proper consecutive engagement with the successive pairs of gripper-fingers, but with their terminal edges in substantial alinement for the purpose of dropping all the fingers together. It is obvious that as the outer clamp of each momentarily-separated couple closes or moves inwardly toward the other clamp the gripper of the former is of course carried therewith toward the gripper of the latter, wherefore in the present machine the wipers are cut away at their outer sides in conformity with such inward movement of the outer gripper-fingers from points sufficiently removed from their initial surfaces, which engage said gripper-fingers when farthest apart, so that the wipers may be arranged sufficiently close together, with their wider initial portions overlapping. In operation, it being remembered that the shaft E rotates uniformly with the shaft D, the innermost wiper $N'$ of each group or series engages and lifts the fingers of the first pair of grippers, or those at adjacent sides of the clamps H and H', while the group of movable clamps is held outward, thus causing said grippers to grip the wire previously pushed under them by means hereinafter explained and hold the same firmly upon the said separated clamps at their adjacent sides. When the clamp H' closes against the clamp H, pressing the first loop bent in between them from the wire, the next wiper $N^2$ engages and lifts the second pair of gripper-fingers, or those of the grippers at adjacent sides of the now-separated clamps H' and $H^2$, and when the clamp $H^2$ closes against the clamp H' the succeeding wiper $N^3$ engages and lifts the third pair of gripper-fingers, or those of the grippers at adjacent sides of the now-separated clamps $H^2$ and $H^3$, and so on to the end of each group. When the outermost clamps $H^5$ of the series finally close against the preceding members, all the wipers having maintained the gripper-fingers elevated pass at substantially the same instant from under said fingers, and thus cause all the grippers simultaneously to release the wire.

The needles $K'$ $K^2$, &c., Figs. 1, 5, 6, and 7, may be adjustably secured to levers or rocker-arms $j$, slidably mounted on the shaft J, and consists, preferably, of thin bars of steel or other suitable material having notches $k$ at their lower extremities and outstanding or depending toes or projections $k'$ below said notches. The needles of each group are adapted to act successively upon the wire, each needle operating in connection with an adjacent pair of clamps, being lowered by the rocker-arm $j$ the instant the inner clamp of the particular couple separates from the other, and pushing by means of its toe $k'$ the wire back under the grippers and firmly adjacent the abutments $h'$ at adjacent sides of the separated clamps just before the grippers grip the wire, being at the same time moved longitudinally on the shaft to bring its notch into engagement against the wire substantially midway the clamps as the outer one begins to close or move toward the other, during which inward movement the needle, still traveling longitudinally between the clamps, is farther depressed to bend or fold the portion of wire spanning the intervening space down or in between said clamps, being suddenly elevated to escape the latter just before closing and immediately returned to its normal position. Other means may of course be employed to force the wire back against the abutments $h'$ and the needles arranged to engage the wire by their notches directly at points midway the separated clamps. Though the present construction is preferred because the toes or projections $k'$ serve not only to push back the wire, but also to insure proper engagement by the notches, and, further, because the needles, being gradually moved longitudinally, are already in movement when the outer clamps begin to close toward the inner ones, thus insuring perfect action. The needles may be properly adjusted on the rocker-arms, and it will be observed that the notches thereof move in the arcs of equal circles, thus bending the several loops of the stay in exact alinement. The needles of each group may be operated by a series of cams or cam-wheels $O'$ $O^2$ $O^3$ $O^4$ $O^5$, &c., secured to and spirally arranged about the shaft F, so as to actuate said needles consecutively, the needle supporting rocker-arms or levers $j$ being provided with rearward toes or lugs $j'$, which are held in contact with the peripheries of said cam-wheels by stout retractile springs $j^2$, interposed between said rocker-arms and a longitudinal rod or support $j^3$ at the front of the machine, or by other suitable means. The said cam-wheels, one of which is shown in detail in Figs. 39 and 40, may consist of circular disks having rim projections or flanges $o$ at their outer sides or edges, against which the toes $j'$ of the rocker-arms are slidably maintained by the retractile springs $j^2$, the latter being preferably obliquely disposed, as shown in Fig. 1, and provided also with peripheral projections or wipers $o'$, which engage and lift said toes to depress the needles, the flanges $o$ being suitably inclined or cam-faced at the said projections, as at $o^2$, for the purpose of moving the needles inwardly simultaneously as they are depressed. The projections $o'$ terminate abruptly, whereby at the proper moments the toes are instantly dropped and the needles instantly elevated to escape the closing clamps, said toes being also drawn outward against the straight or vertical portions of the flanges o to move the needles to their proper outward positions. If desired, the cam-wheels may be further provided at their inner sides or edges with suitable peripheral cam projections, as $o^3$, which serve positively to force the toes $j'$ against the flanges o immediately prior to depression of the needles, and in some instances said projections may be entirely depended upon for such purpose and continued, if desired, as peripheral flanges around the cam-wheels to guide the toes, the springs $j^2$ being employed only for elevating the needles, though preferably the toes are constantly and firmly retained against the flanges by the springs, as in the machine illustrated. In operation, it being remembered that the shaft F rotates uniformly with the shafts D and E, as soon as the movable clamps are shoved in union to their extreme outward positions the first cam-wheel $O'$ of each group begins to depress the first needle $K'$, the depending toe $k'$ of which pushes the wire back against the abutments $h'$ at adjacent sides of the separated clamps H and $H'$, whereupon the adjacent grippers of said clamps grip the wire under action of the first wiper $N'$, and the outer clamp $H'$ is then shoved by the cam $M'$ inwardly toward the clamp H, while the needle having brought its notch $k$ into engagement with the wire midway the separated clamps is further depressed by its cam-wheel and caused to bend or form a loop, being instantly elevated as the projection $o'$ of its cam-wheel passes from the toe of its supporting-lever to escape the clamp the moment before the outer one is forced against the other. As soon as the clamp $H'$ separates from the clamp $H^2$ the second cam-wheel $O^2$ begins to depress and shove inwardly the second needle $N^2$, which operates under action of said cam-wheel in the same manner as the preceding needle, and so on with each succeeding clamp and needle to the end of the series.

The wires 2 to be formed into stays may be cut into proper lengths and presented from between inclined guide-bars P and $P'$ to an intermittent feed device, which is arranged above the clamps and adapted to deliver a wire thereupon at the proper period prior to each stay-making operation. In the present machine the feed device consists of a shaft Q, journaled in suitable standards at the ends of the machine, as well as in the lower extremities of the lower guide-bars $P'$, and having secured thereon adjacent said lower guide-bars disks or collars $q$, which are correspondingly provided with equidistant notches $q'$, and are partially embraced by the curved lower extremities of the upper guide-bars $P'$, as shown more clearly in Figs. 5 and 7. At each intermittent or partial rotation of the shaft Q one of the notches $q'$ of each disk is brought to register with the spaces between the guide-bars and receive a wire therefrom, while at the same time a wire previously received by other notches having been carried around and past the lower curved extremities of the upper bars is dropped from said notches upon the clamps, said wire being directed to fall in proper position upon the latter directly in front of the grippers L by suitable guides $q^2$, which may consist of wires depending from the ends of the shaft Q and a forward rock-shaft R, hereinafter referred to. As a means for intermittently rotating the shaft Q the same may be provided at one end with a ratchet-wheel $q^3$, Fig. 4, rigidly secured thereon and having its teeth, which correspond in number to the circumferential notches in the disks $q$, successively engaged by a pawl or dog $q^4$, which in the present machine is eccentrically pivoted to one end of the shaft E, being supported in proper position by a suitable pin or projection $q^5$, outstanding from one of the feed-shaft-supporting standards and being maintained in proper engagement against the ratchet by a retractile spring $q^6$. At each rotation of the shaft E the pawl is thus moved to snap under and engage a tooth of the ratchet and oppositely moved to partially rotate the feed device, the arrangement preferably being such that a wire is dropped from said feed device upon the clamps immediately after ejection of each finished stay.

The rock-shaft R above mentioned is provided with a number of depending pins or rods $r$, which are normally held by said rock-shaft firmly against the front faces of certain of the clamps, thus obviating all liability of falling of the wire therefrom, it being obvious that the wire is continually shortened, as the loops are successively produced therein, and that its ends are accordingly drawn inwardly from the guides $q^2$. Immediately after each stay-making operation the rock-shaft is turned to move the pins $r$ away from the clamps to permit the finished stay to drop therefrom and immediately oppositely turned, preferably by spring force, as hereinafter explained, to snap said pins back against the clamps to retain the succeeding blank wire upon them.

Mounted on the machine at one end of the series of clamps is a fixed upright plate or abutment S, and at the opposite end of said series of clamps there is a movable plate or butter T, which latter is herein represented, Figs. 1, 4, 32, and 33, upstanding from a horizontal plate or base portion $t$, slidably secured to a rod $t'$, projecting from a suitable support at the end of the machine. The butter is impelled by a retractile spring $t^2$ or other suitable means toward the opposite abutment S, but as each wire is dropped from the feed device is drawn outwardly against force of its spring and then released, thus snapping back and pushing the wire endwise against said abutment, whereby each wire is supported upon the clamps in the same position lengthwise and the loops of the several stays formed therein at corresponding points. As means for actuating the butter the latter is herein represented connected by a cord $t^3$ to a crank device $t^4$, pivoted in a suitable standard at the end of the machine and having a toe or bent portion $t^5$, held by force of the butter-spring in contact with a cam or wiper U on the shaft E, which wiper lifts said toe to retract the butter before delivery of each wire and drops instantly the same to release the butter as the wire falls from the feed device upon the clamps. Each wire being thus delivered in proper position upon the clamps and the opposite movable groups thereof standing in their extreme outward positions the movable clamps of each group simultaneously are consecutively moved inwardly, the needles and grippers coöperating therewith in the manner already fully explained to produce the loops. On completion of the loop-forming operation it is necessary to release the loops from the closed clamps, which is accomplished, as before explained, by turning the spindles $h^4$ of all the clamps simultaneously to permit the hinged face-plates $h^3$ to swing into the recesses at the sides of the clamps. The said spindles of each group may be operated by a series of pins or studs $v$, upstanding from a slide-bar V, which may be fitted in a groove or suitable guideway formed at the top of a longitudinal member A' of the machine-frame disposed beneath the clamps, as shown in Figs. 1, 2, and 8. The slide-bars V may be suitably connected to reciprocating actuating-levers W, pivoted at the ends of the machine-frame and held normally in inward position by retractile springs $w$, but moved outward immediately after each loop-forming operation by suitable cams X on the shaft D or other suitable means, thereby drawing outwardly the slide-bars and bringing the studs $v$ thereon into engagement with the toes $h^5$ at the lower ends of the spindles $h^4$, whereby the latter are turned to permit the hinged plates $h^3$ to recede to release the loops and allow ejection of the finished stay. It is obvious, of course, that the hinged face-plates $h^3$ may be disposed at corresponding sides or faces of the clamps of the entire series and the spindles operated from a single slide-bar instead of a pair of oppositely-moving slide-bars, as herein shown, if desired.

Ejection of the finished stay may be accomplished by a number of ejectors or push-rods $y$, fitted in suitable grooves or guides in the tops of certain of the clamps and suitably connected to arms $y'$, depending from the rock-shaft Y, as shown more clearly in Figs. 5 and 7. The said rock-shaft Y, together with the previously-mentioned rock-shaft R, may be rocked in unison at the proper periods from a lever Z, connected to arms on said rock-shafts by links $y^2$ and $r'$, respectively, as shown in Figs. 1 and 4. Said lever may be held in proper normal position by a spring $z$ or other suitable means and operated to rock the rock-shafts by a lug or wiper $z'$, projecting from a collar on the shaft F, which lug in the machine herein illustrated immediately upon release of the loops between the clamps passes under a roller $z^2$ at the upper end of said lever, thereby moving the latter to turn the rock-shafts simultaneously, so as to remove the pins $r$ from the front faces of the clamps and cause the ejectors $y$ to push off the finished stay, which may fall from the clamps upon suitable inclined rods or guides and pass from the machine, the rock-shafts being immediately oppositely turned, by force of the spring $z$, to draw back the ejectors and snap the pins $r$ back against the front faces of the clamps to hold in place the succeeding and just previously delivered blank wire.

A brief summary of the general operation of the parts in a cycle of the action of the machine, taken in connection with explanations of operation already given, will now be sufficient. A wire may be delivered upon the clamps as each finished stay is ejected, being retained in proper position thereunder by the pins $r$, depending from the rock-shaft R, and being immediately struck endwise and pushed against the plate or abutment S by the butter T. The opposite groups of movable clamps are then shoved outward by the cams M, while the innermost or first pair of needles K' begin to descend under action of the cams or cam-wheels O', their depending toes or projections $k'$ engaging and pushing the wire firmly against the abutments $h'$ at adjacent sides of the separated clamps H and H', whereupon, said clamps being separated to their full extent, the adjacent grippers thereof are caused to grip the wire by action of the wipers N'. The cams M' now engage the innermost or first pair of movable clamps H' and shove them inward against the fixed clamps H, during which movement the needles K', having brought their notches $k'$ into engagement with the wire substantially midway said separated clamps, are further depressed, thus bending or folding the intervening portions of wire in between the clamps, being suddenly elevated just before the outer clamps close against the others and press together the members of the loops thus formed. As the clamps H' separate from the clamps $H^2$, the succeeding pair of needles $K^2$ under action of their cams $O^2$ begin to descend and force the wire against the abutments at adjacent sides of said clamps, the adjacent grippers thereof being operated by the wipers $N^2$ to grip the wire immediately after inward closing of said clamps H', whereupon the clamps $H^2$ are moved by the cams $M^2$ toward the clamps H', while the needles continue to descend and bend loops in the wire, being suddenly elevated just before the clamps $H^2$ close against the clamps H', as before. The same movements are repeated consecutively by the several coöperating parts at each side of the machine, the mechanism at both sides acting simultaneously, thus producing in succession pairs of loops at opposite sides of the middle of the wire. When the last or outermost clamps of the series herein, $H^5$, are closed against the preceding clamps, the grippers L of all the clamps are released simultaneously, the gripper-fingers $l$ being dropped from the terminal edges of all the wipers or gripper-actuating cams N' N², &c., at once. The cams X then engage and move the levers W to draw the slide-bars V outward to operate the loop-releasing devices, and immediately thereupon the rock-shafts R and Y are rocked by the lever Z to withdraw the pins $r$ from the faces of the clamps and cause the ejectors $y$ to push off the finished stay.

It is obvious that the group of clamps and coöperating devices at each side of the fixed clamps, together with the actuating mechanism therefor, constitute a complete machine. It is also obvious that the entire series of clamps may, if desired, be arranged to move in the same direction or from end to end of the machine instead of from ends to center, as herein represented, though the latter arrangement is preferred because the action of each successive clamp of each group is counterbalanced by opposite action of the corresponding clamp of the other group, and, furthermore, because twice the number of loops are produced in the same amount of time with the same rate of rotation of the driving-shaft. In some instances the middle or intermediate fixed clamps H may be dispensed with and the adjacent clamps H' arranged to alternately come together and separate, an intermediate needle being of course provided to operate in connection with said adjacent clamps to produce central or intermediate loops in the stays. The invention is also capable of embodiment in other forms and susceptible of various modifications in details of construction and arrangement of parts without departing from the scope thereof, and hence we do not desire to be limited to the particular construction and arrangement herein illustrated.

Having thus described our invention, what we claim as new, and desire to secure by Letters Patent of the United States, is—

1. In a machine of the character described, means for loosely supporting a wire at different points, means for moving said points of support a distance lengthwise consecutively, and means for folding the portions of wire successively left between adjacent and consecutively-separated points of supports into loops while bringing said points consecutively one up to another, substantially as described.

2. In a machine of the character described, means for consecutively securing a wire at intervals, and means for consecutively bending the intervening portions thereof into loops while bringing the points of securance consecutively one up to another, substantially as described.

3. In a wire-stay-making machine, a series of loop-bending devices adapted to operate on a wire progressively from an intermediate point toward opposite ends simultaneously, thus consecutively bending loops at intervals in opposite portions thereof, substantially as described.

4. In a machine of the character described, means for consecutively securing a wire at intervals at opposite sides of an intermediate point, and means for consecutively bending the opposite intervening portions into loops while bringing the oppositely-disposed points of support consecutively toward said intermediate point, substantially as described.

5. In a wire-stay-making machine, a series of movable wire-supports arranged to be consecutively moved one from and toward another, and means for bending in between said supports as they are brought consecutively together loops from a wire placed lengthwise upon the series, substantially as described.

6. In a wire-stay-making machine, a series of consecutively separating and closing clamps, and means for bending in between said clamps as they consecutively close one against another loops from a wire placed lengthwise upon the series, substantially as described.

7. In a wire-stay-making machine, a series of consecutively separating and closing clamps, means for bending in between said clamps as they move consecutively one against another loops from a wire placed lengthwise upon the series, and means for releasing the loops thus formed from the closed clamps, substantially as described.

8. In a wire-stay-making machine, a series of consecutively separating and closing clamps, means for bending in between said clamps as they move consecutively one against another loops from a wire placed lengthwise upon the series, means for releasing the loops from the closed clamps, and means for ejecting the finished stay, substantially as described.

9. In a wire-stay-making machine, a series of consecutively separating and closing clamps, means for securing a wire against adjacent clamps successively as they stand separated, and means for bending the portions of wire extending across the consecutively-created spaces in between said clamps as they move consecutively one toward another, substantially as described.

10. In a wire-stay-making machine, a series of consecutively separating and closing clamps, means for securing a wire placed upon the series successively against adjacent clamps as they stand separated, means for bending loops from said wire in between said clamps as they move consecutively one toward another, and means for releasing the wire from all the closed clamps simultaneously, substantially as described.

11. In a wire-stay-making machine, a series of consecutively separating and closing clamps, means for securing a wire placed upon the series successively against adjacent clamps as they stand separated, means for bending loops from said wire in between said clamps as they move consecutively one toward another, means for releasing the wire from all the closed clamps simultaneously and for ejecting the finished stay, substantially as described.

12. In a wire-stay-making machine, a group of clamps arranged to move in consecutive order from one closed position to another, and means for consecutively bending in between said clamps while moving one toward another loops from a wire placed lengthwise against the group, substantially as described.

13. In a wire-stay-making machine, a group of clamps arranged to move in consecutive order from one closed position to another, and means for successively securing a wire at adjacent clamps as they consecutively stand separated and bending the intervening portions of said wire into loops between said clamps while closing one toward another, substantially as described.

14. In a wire-stay-making machine, a group of clamps arranged to be alternately moved a distance in union and returned consecutively, and means for bending in between successive adjacent clamps as they consecutively return loops from a wire placed upon the group, substantially as described.

15. In a wire-stay-making machine, the combination, with a group of loop-pressing clamps arranged to be moved in succession from one closed position to another, of a series of actuating-cams therefor adapted to engage and operate said clamps in consecutive order, substantially as described.

16. In a wire-stay-making machine, the combination, with a group of movable loop-pressing clamps, of an actuating-cam adapted to move the group a distance in one direction by engagement with an end clamp, and a series of actuating-cams adapted to engage and return said clamps in consecutive order, substantially as described.

17. In a wire-stay-making machine, the combination, with a group of loop-pressing clamps arranged to be moved successively, of a driving-shaft, and a series of actuating-cams spirally arranged thereon to engage and operate said clamps in consecutive order, substantially as described.

18. In a wire-stay-making machine, a series of clamps, one of which is fixed while the remaining ones are adapted to move alternately in a group away from the fixed member and consecutively back toward the same, and means for bending in between said clamps as the movable ones consecutively return loops from a wire placed upon the series, substantially as described.

19. In a wire-stay-making machine, a series of clamps arranged to move in groups in opposite directions and return consecutively in pairs consisting of corresponding members of said groups, and means for bending in between adjacent clamps as they are returned portions of a wire placed upon the series, substantially as described.

20. In a wire-stay-making machine, a series of clamps arranged to separate in groups in opposite directions from an intermediate fixed member of the series and to return consecutively in opposite pairs, and means for bending in between adjacent clamps as they consecutively close one toward another portions of a wire placed upon the series, substantially as described.

21. In a wire-stay-making machine, the combination, with a series of loop-pressing clamps arranged to operate in two oppositely-moving groups, of a pair of cams adapted to move said groups outward and corresponding series of cams adapted to return the corresponding members of said groups consecutively, substantially as described.

22. In a wire-stay-making machine, the combination, with a series of loop-pressing clamps, of a driving-shaft, and a series of actuating-cams thereon arranged in two opposite spirally-disposed groups, the innermost cams of each group being adapted to move the clamps in groups in opposite directions and the remaining cams of each group to return the clamps of the corresponding group consecutively, substantially as described.

23. In a machine of the character described, a series of consecutively separating and closing clamps, means for securing a wire against adjacent clamps successively as they stand separated in such manner that the succeeding intervening portions are caused to diverge correspondingly from the general line of the wire, and means for folding said portions into loops between said clamps as the latter consecutively close one against another, substantially as and for the purpose described.

24. In a wire-stay-making machine, a series of consecutively separating and closing clamps, the same being provided with correspondingly-oblique abutments thereon, means for securing a wire successively against the abutments at adjacent sides of adjacent clamps as the latter stand separated, and means for bending the succeeding intervening portions of wire in between said clamps as they consecutively close one toward another, substantially as and for the purpose described.

25. In a wire-stay-making machine, a series of consecutively separating and closing clamps, the same being provided with wire-gripping devices, means whereby the grippers of adjacent clamps are successively caused to grip a wire placed upon the series as the clamps stand separated, and means for bending the succeeding intervening portions of the wire in between said clamps as they consecutively close one after another, substantially as described.

26. In a wire-stay-making machine, a series of consecutively separating and closing clamps provided with wire-gripping devices at their edges, means whereby the pairs of grippers at adjacent sides or edges of said clamps are successively caused to grip a wire placed upon the clamps as the latter consecutively stand separated, and means for bending the succeeding intervening portions of wire in between the clamps as they close one after and toward another, substantially as described.

27. In a wire-stay-making machine, a series of consecutively separating and closing clamps provided with wire-gripping devices at their edges, means whereby the pairs of grippers at adjacent sides or edges of said clamps are successively caused to grip a wire placed upon the clamps as the latter consecutively stand separated, means for bending the succeeding intervening portions of wire in between adjacent clamps as they consecutively close, and means whereby all the grippers are caused to release the wire from the closed clamps, substantially as described.

28. In a wire-stay-making machine, a series of consecutively separating and closing clamps provided with wire-gripping devices at their edges, means whereby the pairs of grippers at adjacent sides or edges of said clamps are successively caused to grip a wire placed upon the clamps as the latter consecutively stand separated, means for bending the succeeding intervening portions of wire in between adjacent clamps as they consecutively close, and means whereby all the grippers are simultaneously caused to release the wire from the closed clamps, substantially as described.

29. In a wire-stay-making machine, the combination, with a series of consecutively separating and closing clamps between which loops are bent in succession from a wire placed upon the series, said clamps being provided with wire-gripping devices at their adjacent sides or edges, of a series of actuating devices adapted to operate in succession the pairs of grippers at adjacent sides of said clamps to cause them to grip the wire as the clamps consecutively stand separated, substantially as described.

30. In a wire-stay-making machine, the combination, with a series of consecutively separating and closing clamps between which loops are bent in succession from a wire placed upon the series, said clamps being provided with wire-gripping devices, of a series of actuating-cams adapted to engage and operate in succession the grippers of adjacent clamps as the latter consecutively stand separated, substantially as described.

31. In a wire-stay-making machine, the combination, with a series of consecutively separating and closing clamps between which loops are bent in succession from a wire placed upon the series, said clamps being provided with wire-gripping devices, of a rotating shaft, and a series of gripper-actuating devices spirally arranged thereon and adapted to engage and operate the grippers in proper succession during the consecutive movements of said clamps, substantially as described.

32. In a wire-stay-making machine, the combination, with a series of consecutively separating and closing clamps between which loops are bent in succession from a wire placed upon the series, of wire-grippers pivotally mounted thereon and having opposite extensions or fingers, and a series of gripper-actuating devices adapted to engage said fingers to operate the grippers successively during the consecutive movements of the clamps, substantially as described.

33. In a wire-stay-making machine, the combination, with a series of consecutively separating and closing clamps between which loops are bent in succession from a wire placed upon the series, of wire-grippers pivotally mounted thereon and having opposite extensions or fingers, and a rotating shaft, and a series of wipers spirally arranged thereon and adapted to lift said fingers to operate the grippers successively during the consecutive movements of the clamps, substantially as described.

34. In a wire-stay-making machine, the combination, with a series of consecutively separating and closing clamps between which loops are bent in succession from a wire placed upon the series, of wire-grippers pivotally mounted thereon and having opposite extensions or fingers, and a series of gripper-finger-engaging wipers consisting of successively shorter segments arranged with their initial edges in retrogressive order but their terminal edges in substantial alinement, whereby said fingers are raised in successive order and dropped simultaneously, substantially as and for the purpose described.

35. In a wire-stay-making machine, the combination, with a series of consecutively separating and closing clamps between which loops are bent in succession from a wire placed upon the series, of wire-grippers pivotally mounted thereon and having opposite extensions or fingers, and a series of gripper-actuating devices adapted to engage operatively said fingers in regular sequence during consecutive movement of the clamps and to release them simultaneously after such movement, substantially as described.

36. In a wire-stay-making machine, the combination, with a series of consecutively separating and closing clamps between which loops are bent in succession from a wire placed upon the series, and a pair of wire-grippers pivotally mounted at adjacent sides on the clamps of each adjacent couple and provided with opposite extensions or fingers, of a series of actuating-cams adapted to engage the fingers of said pairs in succession as the clamps consecutively stand separated, substantially as described.

37. In a wire-stay-making machine, the combination, with a series of consecutively separating and closing clamps between which loops are bent in succession from a wire placed upon the series, and a pair of wire-grippers pivotally mounted at adjacent sides on the clamps of each adjacent couple and provided with opposite extensions or fingers, of a series of actuating-cams adapted to engage the fingers of said pairs in succession as the clamps consecutively stand separated, and release them simultaneously after the last clamp closes, substantially as described.

38. In a wire-stay-making machine, the combination, with a series of consecutively separating and closing clamps between which loops are bent in succession from a wire placed upon the series, and a pair of wire-grippers pivotally mounted at adjacent sides on the clamps of each adjacent couple and provided with opposite extensions or fingers, of a rotating shaft and a series of wipers thereon, said wipers being arranged to lift said pairs of fingers in succession, as the clamps consecutively stand separated, and to release all of said fingers after the last clamp closes, substantially as described.

39. In a wire-stay-making machine, a series of loop-pressing clamps arranged in two opposite consecutively separating and closing groups, corresponding members of which groups move simultaneously, wire-gripping devices mounted on said clamps at their adjacent sides or edges, and means whereby the pairs of adjacent grippers of adjacent couples of each group are successively caused to grip a wire placed upon the clamps as the latter consecutively stand separated, substantially as described.

40. In a wire-stay-making machine, a series of loop-pressing clamps arranged in two opposite consecutively separating and closing groups, corresponding members of which groups move simultaneously, wire-gripping devices mounted on said clamps at their adjacent sides or edges, means whereby the pairs of adjacent grippers of adjacent couples of each group are successively caused to grip a wire placed upon the clamps as the latter consecutively stand separated, and means whereby all the grippers are simultaneously caused to release the wire from the closed clamps, substantially as described.

41. In a wire-stay-making machine, a series of consecutively separating and closing clamps having abutments thereon and wire-grippers pivoted at the outer sides of said abutments, means for forcing a wire placed upon the series successively against the abutments of adjacent couples and causing the adjacent grippers thereof to grip said wire as the clamps consecutively stand separated, and means for bending the succeeding intervening portions of wire in between the clamps as they close one after and upon another, substantially as described.

42. In a wire-stay-making machine, a series of consecutively separating and closing clamps having oblique abutments thereon and wire-grippers pivoted at the outer sides of said abutments, means for forcing a wire placed upon the series successively against the abutments of adjacent couples and causing the adjacent grippers thereof to grip said wire as the clamps consecutively stand separated, and means for bending the succeeding intervening portions of wire in between the clamps as they close one after and upon another, substantially as described.

43. In a wire-stay-making machine, a series of consecutively separating and closing clamps, a series of wire-bending devices, and means whereby said devices are successively caused to bend portions of a wire placed upon the clamps in between adjacent clamps as they consecutively close one toward another, substantially as described.

44. In a wire-stay-making machine, a series of consecutively separating and closing clamps, a series of needles adapted to travel respectively between adjacent clamps, and means for successively depressing said needles as the clamps close one after another to engage and bend portions of a wire placed upon the series in between successive adjacent clamps and for suddenly elevating said needles to escape said clamps just before they close one against another, substantially as described.

45. In a wire-stay-making machine, a series of consecutively separating and closing clamps, a series of intermediately-arranged and slidably-pivotal wire-bending devices, and means for actuating said needles in succession to engage and bend portions of a wire placed upon the clamps in between adjacent clamps as they close one after and against another, substantially as described.

46. In a wire-stay-making machine, the combination, with a series of consecutively separating and closing clamps, of a series of intermediately-arranged needles, the latter being carried by rocker-arms slidable on a fixed support and provided with toes, and a series of needle-actuating cams adapted to engage said toes in succession, whereby the needles are successively operated to bend portions of a wire placed upon the clamps in between the same as they close one after and toward another, substantially as described.

47. In a wire-stay-making machine, the combination, with a series of consecutively separating and closing clamps, of a series of intermediately-arranged needles, the latter being carried by rocker-arms slidable on a fixed support and provided with toes, a rotating shaft, and a series of needle-actuating cams spirally arranged thereon to engage said toes in succession, whereby the needles are successively operated to bend portions of a wire placed upon the clamps in between the same as they close one after and toward another, substantially as described.

48. In a wire-stay-making machine, the combination, with a series of consecutively separating and closing clamps having abutments thereon, of a series of needles arranged to operate respectively between adjacent clamps, means whereby said needles are successively caused to force a wire placed upon the series against the abutments of adjacent clamps as they consecutively separate and to bend the succeeding intervening portions of wire in between said separated clamps as they close one toward another, substantially as described.

49. In a wire-stay-making machine, the combination, with a series of consecutively separating and closing clamps, having abutments thereon, of a series of needles arranged to operate respectively between adjacent clamps, said needles consisting of thin notched bars having toes below their notches, means for successively depressing said needles as the clamps consecutively separate, whereby their toes are caused to force a wire against abutments of adjacent clamps, and further depressing the same as the clamps consecutively close, whereby their notches are caused to bend or fold the succeeding intervening portions of wire into loops between the closing-clamps, substantially as described.

50. In a wire-stay-making machine, the combination, with a series of separating and closing clamps, of a series of needles adapted to operate respectively between adjacent clamps, said needles having notches and toes below said notches, means for depressing each needle as the adjacent clamps between which the same operates are separated, whereby its toe is caused to engage and push a wire into proper position against said clamps, and for further depressing said needle as said clamps close to fold the intervening portion of wire into a loop, substantially as described.

51. In a wire-stay-making machine, the combination, with a series of separating and closing clamps having correspondingly-oblique abutments thereon, of a series of needles adapted to operate respectively between adjacent clamps, said needles having notches and toes below the same, means for depressing each needle as the clamps between which it operates are separated, whereby its toe is caused to force a wire against the abutments of said clamps, and for further depressing said needle as said clamps close to bend the intervening portion of wire in between said closing clamps, substantially as described.

52. In a wire-stay-making machine, the combination, with a series of separating and closing loop-pressing clamps, of a series of interacting needles consisting of thin bars having notches and toes below said notches, substantially as and for the purpose described.

53. In a wire-stay-making machine, the combination, with a series of separating and closing loop-pressing clamps, of a series of interacting needles consisting of thin bars having notches and toes below said notches; said needles being secured to rocker-arms slidable on a fixed support, substantially as and for the purpose described.

54. In a wire-stay-making machine, the combination, with a series of separating and closing clamps provided with wire-gripping devices, of a series of needles adapted to operate respectively between adjacent clamps, said needles having notches and toes below said notches, means for partially depressing each needle as the clamps between which it operates are separated, whereby its toe is caused to push a wire placed upon the series under the grippers of said clamps, means for actuating said grippers to grip the wire, and for further depressing said needle as said clamps close to bend the intervening portion of wire in between said clamps, substantially as described.

55. In a wire-stay-making machine, the combination, with a series of consecutively separating and closing clamps provided with wire-gripping devices, of a series of needles adapted to operate successively between adjacent clamps, said needles having notches and toes below said notches, means for partially depressing each needle as the clamps between which it operates are separated, whereby its toe is caused to push a wire placed upon the series under the grippers of said clamps, means for actuating said grippers to grip the wire, and for further depressing said needle as said clamps close to bend the intervening portion of wire in between said clamps, substantially as described.

56. In a wire-stay-making machine, a series of consecutively separating and closing clamps, and a series of needles adapted to operate successively between adjacent clamps, means for moving each needle to bring the same into engagement with a wire placed upon the series substantially midway adjacent clamps when the latter stand separated, and for depressing said needle while maintaining it midway said clamps as the latter close to fold the intervening portion of wire in between said clamps, substantially as described.

57. In a wire-stay-making machine, the combination, with a series of loop-pressing clamps arranged in two opposite consecutively separating and closing groups, of a series of wire-bending devices arranged in corresponding groups, the devices of each group being adapted to bend in succession intervening portions of a wire placed upon the series in between the consecutively-separated clamps as they close one after another, substantially as described.

58. In a wire-stay-making machine, a series of consecutively separating and closing clamps, one clamp of each adjacent couple being provided with a movable plate in its clamping face or side, means for successively bending in between said clamps while closing loops from a wire placed upon the series, and means for moving said plates when the clamps are closed to release the loops, substantially as described.

59. In a wire-stay-making machine, a series of consecutively separating and closing clamps between which loops are successively bent from a wire placed upon the series, one clamp of each adjacent couple being provided with a movable plate in its clamping side or face, spindles journaled behind said plates, means for normally holding said spindles in position to maintain the plates outward, and means for turning said spindles when all the clamps are closed to permit said plates to move inward and release the loops, substantially as described.

60. In a wire-stay-making machine, a series of consecutively separating and closing clamps between which loops are successively bent from a wire placed upon the series, one clamp of each adjacent couple being provided with a movable plate in its clamping side or face, spindles journaled behind said plates against which the latter are spring-forced, said spindles being spring-maintained in position to hold the clamps outward and having toes at their lower ends, and a series of devices adapted simultaneously to engage said toes, when the clamps are closed, and thereby turn the spindles to permit the movable plates to move inward and release the loops, substantially as described.

61. In a wire-stay-making machine, the combination, with a series of clamps between which loops are formed from a wire, one clamp of each adjacent couple being provided with a movable plate in its clamping side or face, spindles journaled behind said plates against which the latter are spring-forced, said spindles being spring-maintained in position to fold the clamps outward and having toes at their lower ends, a slide-bar having a series of studs thereon, and means for moving said slide-bar when the clamps are closed to bring said studs into engagement with said toes and thereby turn the spindles to permit movement of said plates to release the loops, substantially as described.

62. In a wire-stay-making machine, the combination, with a series of clamps between which loops are formed from a wire, one clamp of each adjacent couple being provided with a movable plate in its clamping side or face, devices normally maintaining said plates outward but adapted to permit them to recede or move inward, of a reciprocatory member adapted to engage all of said devices simultaneously when the clamps are closed to move the plates to release the loops, substantially as described.

63. In a wire-stay-making machine, the combination, with a series of loop-pressing clamps, and means for feeding wires thereupon, of an abutment at one end of the series, and a butter at the opposite end, and means for drawing back and releasing said butter as each wire is delivered upon the clamps, substantially as and for the purpose described.

64. In a wire-stay-making machine, the combination, with a series of separating and closing clamps between which while closing loops are bent from a wire placed upon the series, of a number of push-rods on certain of said clamps adapted when the clamps are closed to move forward and push off the finished stay, substantially as described.

65. In a wire-stay-making machine, the combination, with a driving-shaft, of a movable power-shaft, and coöperative friction-gears, and means for throwing and maintaining said gears into or out of driving contact at will, whereby the machine may be instantly started or stopped at any stage of operation, substantially as described.

In testimony whereof we affix our signatures in presence of two witnesses.

JAMES KELLEY.
WALTER V. REID.
PETTIS A. REID.

Witnesses:
JOHN E. MOFFITT,
RICHARD ESTELLE.